Jan. 30, 1968   E. F. COX   3,366,258
APPARATUS FOR STORING AND TRANSFERRING RAILS
Filed May 12, 1964   6 Sheets-Sheet 3

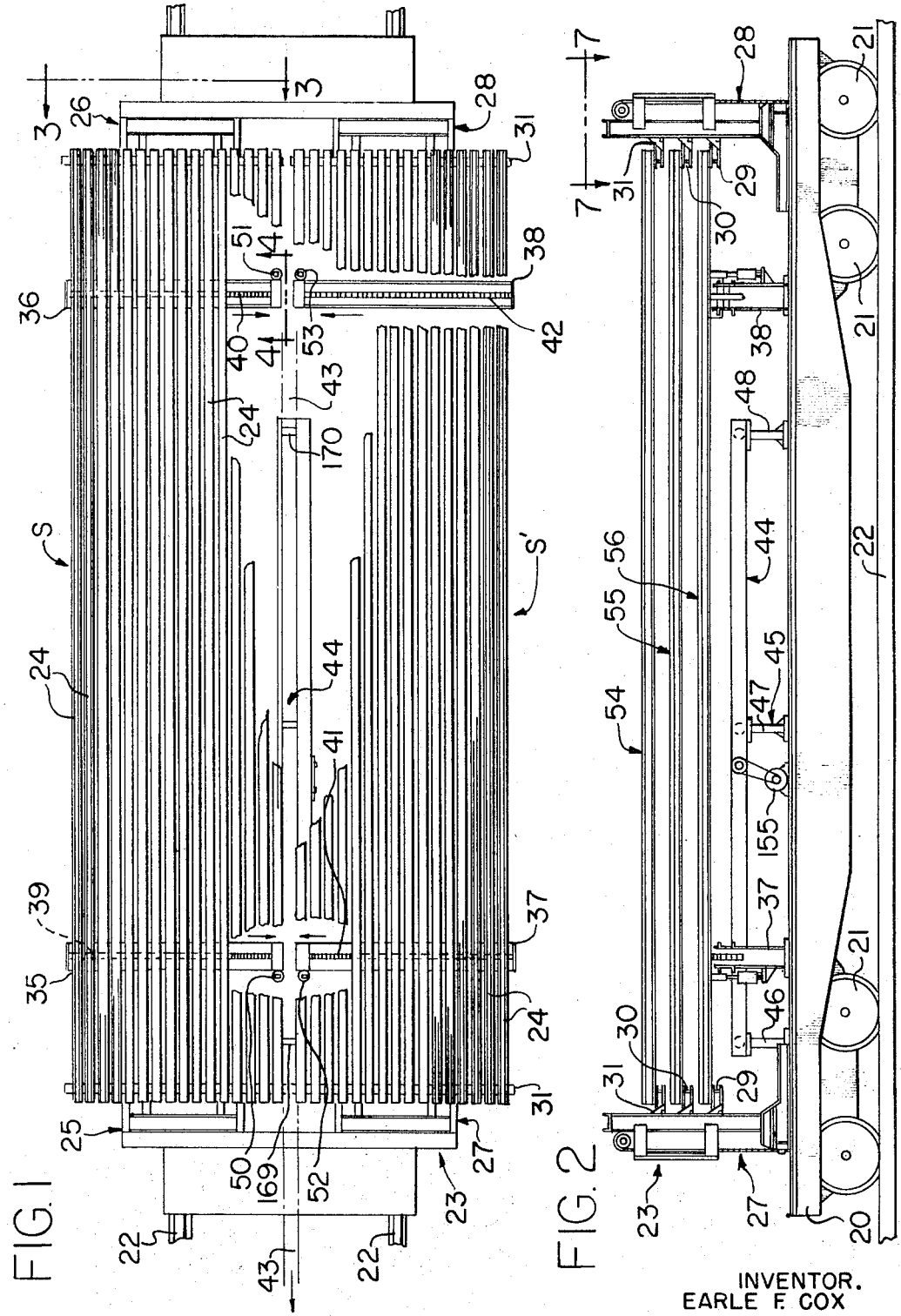

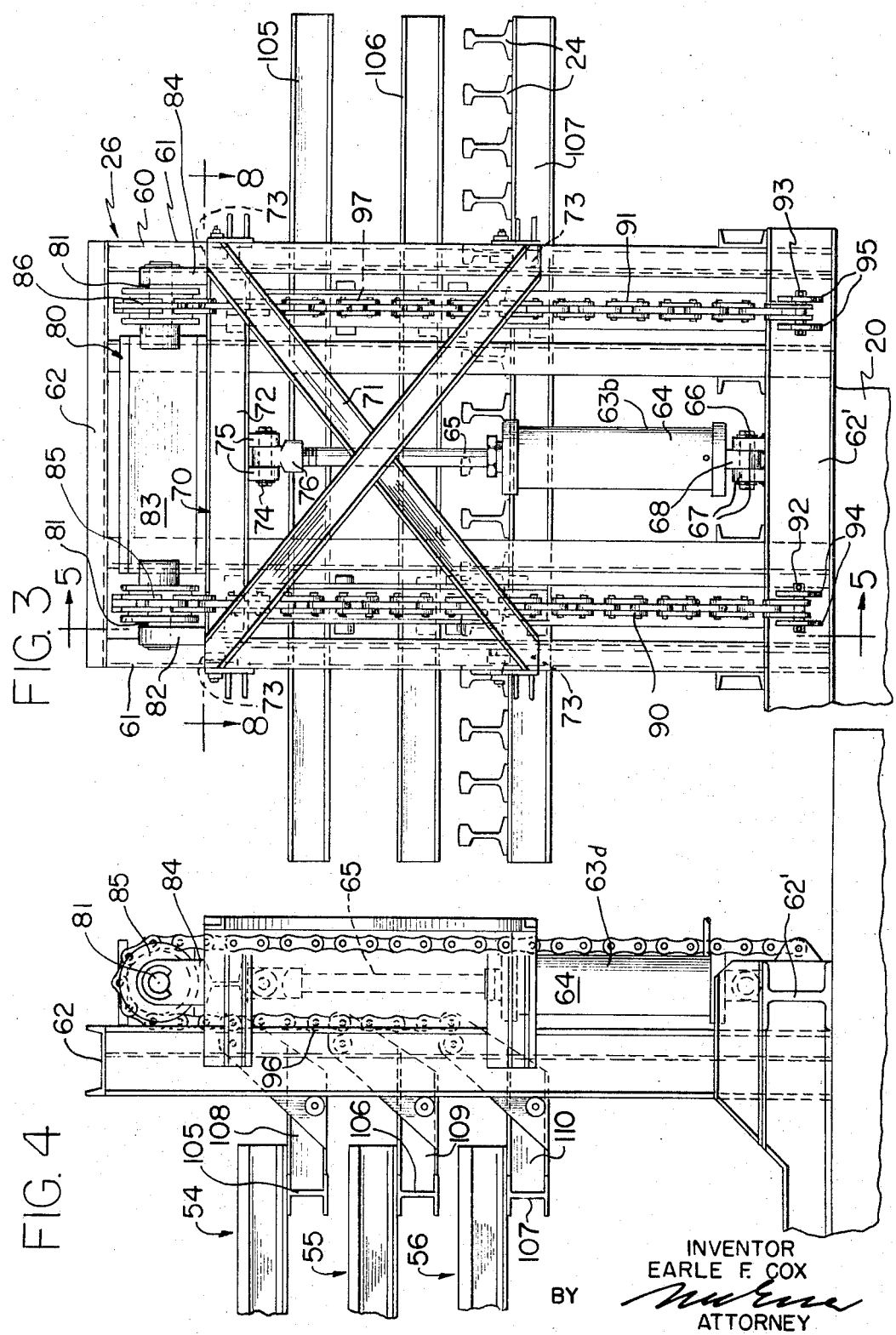

INVENTOR.
EARLE F. COX

BY

ATTORNEY

Jan. 30, 1968 E. F. COX 3,366,258
APPARATUS FOR STORING AND TRANSFERRING RAILS
Filed May 12, 1964 6 Sheets-Sheet 4
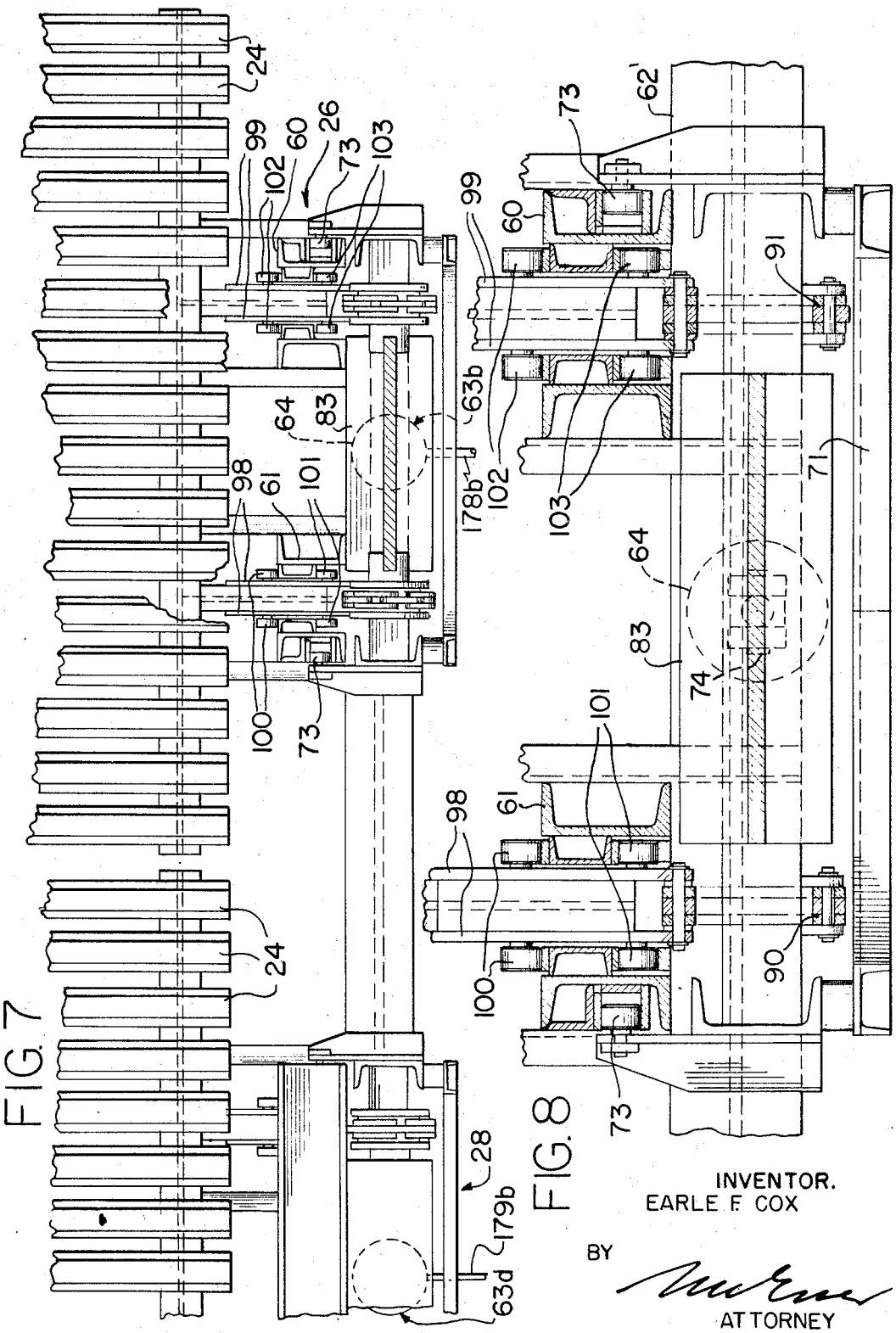
INVENTOR.
EARLE F. COX
BY
ATTORNEY

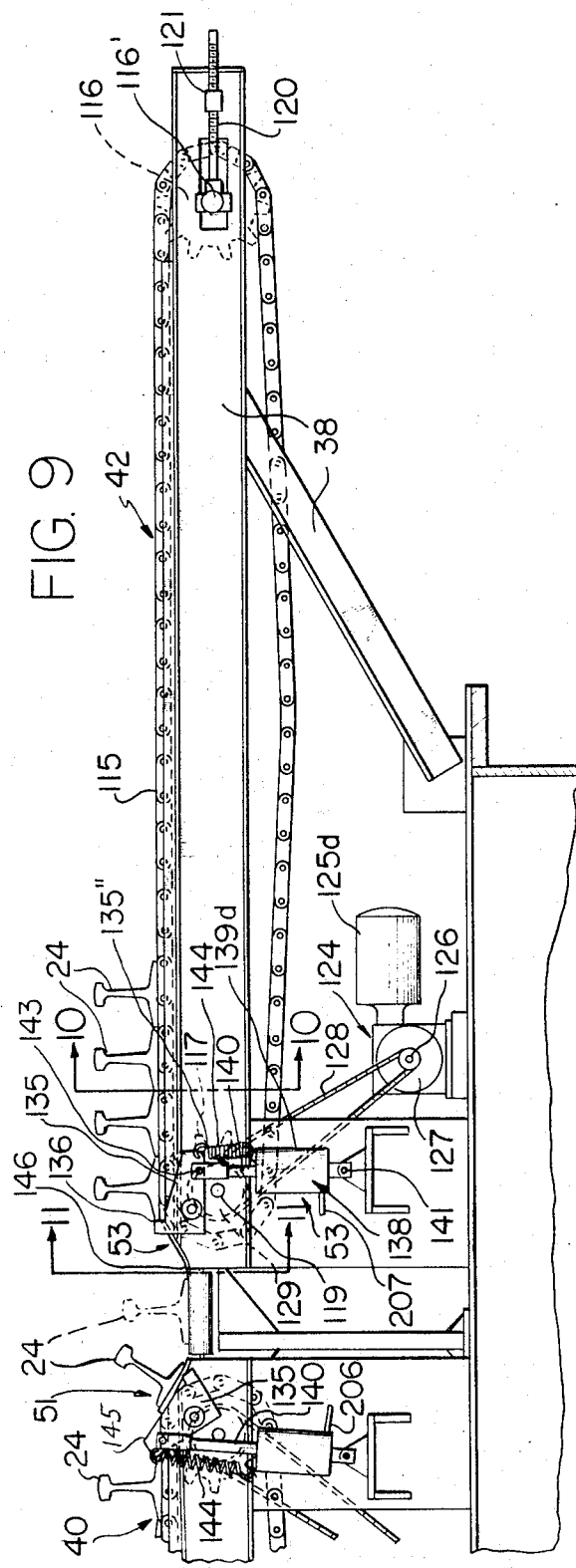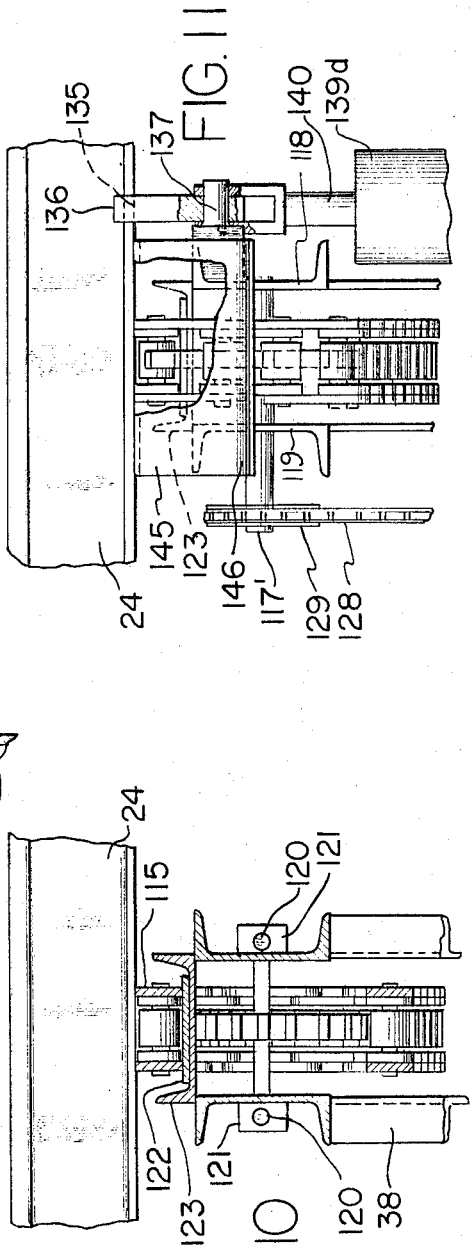

Jan. 30, 1968  E. F. COX  3,366,258
APPARATUS FOR STORING AND TRANSFERRING RAILS
Filed May 12, 1964  6 Sheets-Sheet 6
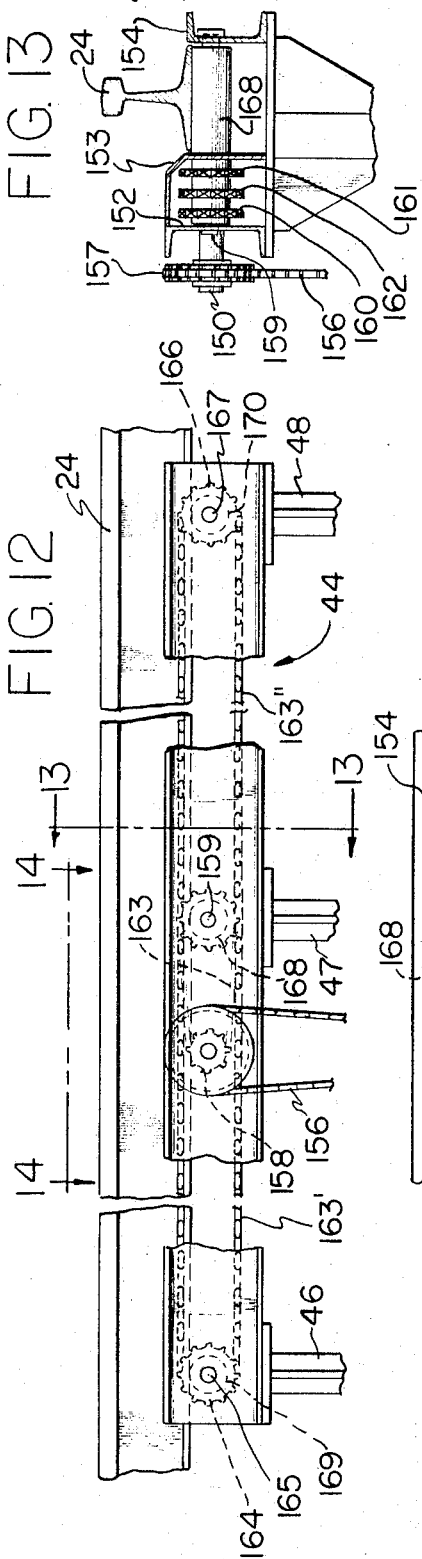
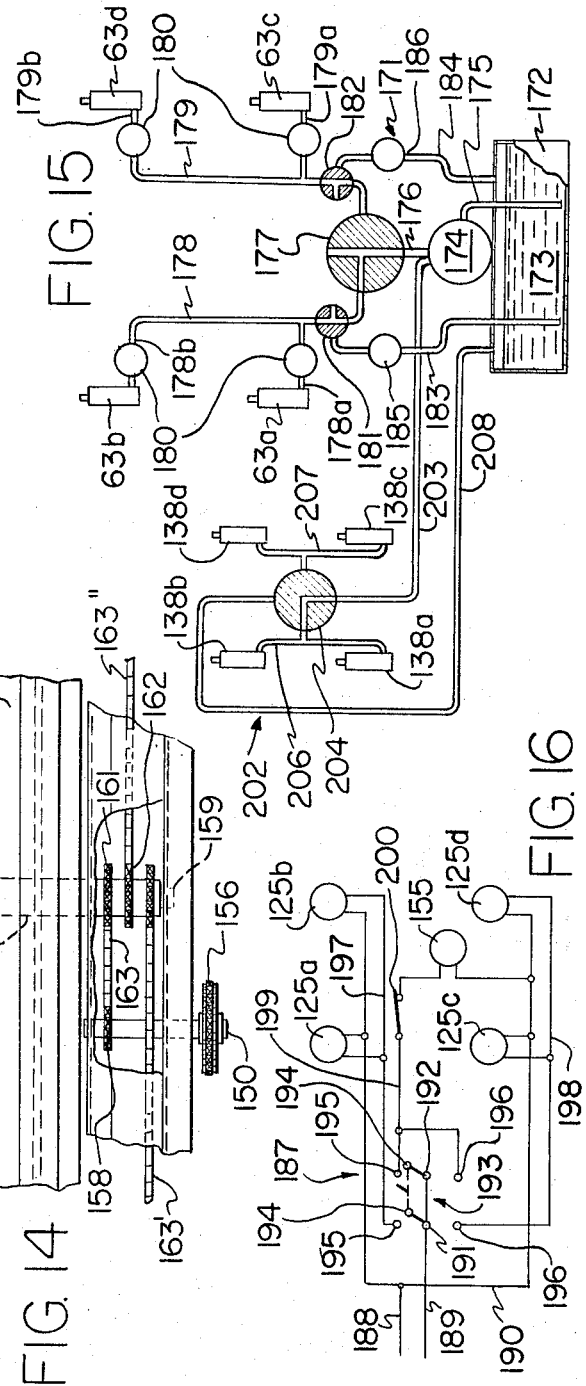
INVENTOR.
EARLE F. COX
BY
ATTORNEY

United States Patent Office 3,366,258
Patented Jan. 30, 1968

3,366,258
APPARATUS FOR STORING AND TRANSFERRING RAILS
Earle F. Cox, Birmingham, Mich., assignor to Chemetron Corporation, Chicago, Ill., a corporation of Delaware
Filed May 12, 1964, Ser. No. 366,779
3 Claims. (Cl. 214—518)

This invention relates to an apparatus for storing and transferring rails.

It is a feature of the invention to provide an apparatus having storage capacity for a relatively large number of railroad rails which has vertical transferring means for lowering tiers of rails successively onto transverse conveying means, and transferring means for transferring the rails to longitudinal conveying means for delivering the rails one-by-one to a rail welding apparatus.

In accordance with a specific embodiment of the invention, an apparatus is provided which stores rails in an arrangement of sets of tiers, with a pair of transverse conveyors being disposed below each set of tiers. As the need for transferring the rails arises, the lowermost tier of rails can be lowered onto its associated pair of transverse conveyors. Each pair of transverse conveyors leads to a pair of transferring mechanisms which, by selective operation, transfers the rails one-by-one to a longitudinal central zone where a longitudinal conveyor is disposed. The longitudinal conveyor is operated to convey the rails one-by-one to a welding apparatus for welding rails into continuous lengths. When the rails on one pair of transverse conveyors have been depleted, the next successive tier of rails can be loaded onto that pair of transverse conveyors, and so on.

In the diagrammatic, illustrative drawings:

FIGURE 1 is a top plan view of an apparatus for storing rails, mounted on a flatcar;

FIGURE 2 is a side elevational view of the apparatus and flatcar shown in FIGURE 1;

FIGURE 3 is an end elevational view taken along line 3—3 of FIGURE 1, showing in detail one vertical rail transferring mechanism;

FIGURE 4 is a side elevational view taken along line 4—4 of FIGURE 1, showing one of the vertical rail transferring mechanisms with its rail support devices in their raised positions;

FIGURE 7 is a top plan view taken along the line 7—7 of FIGURE 2;

FIGURE 8 is a sectional view taken along line 8—8 of FIGURE 3;

FIGURE 9 is an elevational view showing one transverse conveyor and a fragmentary portion of an opposed transverse conveyor and opposed transferring mechanisms for transferring the rails from the transverse conveyors to a longitudinal conveyor;

FIGURE 10 is an enlarged sectional view taken along line 10—10 of FIGURE 9;

FIGURE 11 is an enlarged sectional view taken along line 11—11 of FIGURE 9;

FIGURE 12 is a broken away side elevational view showing the longitudinal conveyor and a portion of its drive mechanism and mounting frame;

FIGURE 13 is a sectional view taken along line 13—13 of FIGURE 12;

FIGURE 14 is a top plan view taken along line 14—14 of FIGURE 12;

FIGURE 15 is a schematic view showing a control mechanism for operating the vertical rail transferring mechanisms and showing a control mechanism for operating those transferring mechanisms onto which rails are discharged by the transverse conveyors; and FIGURE 16 is a circuit diagram for operating the motors of the transverse and longitudinal conveyors.

Figure 5:
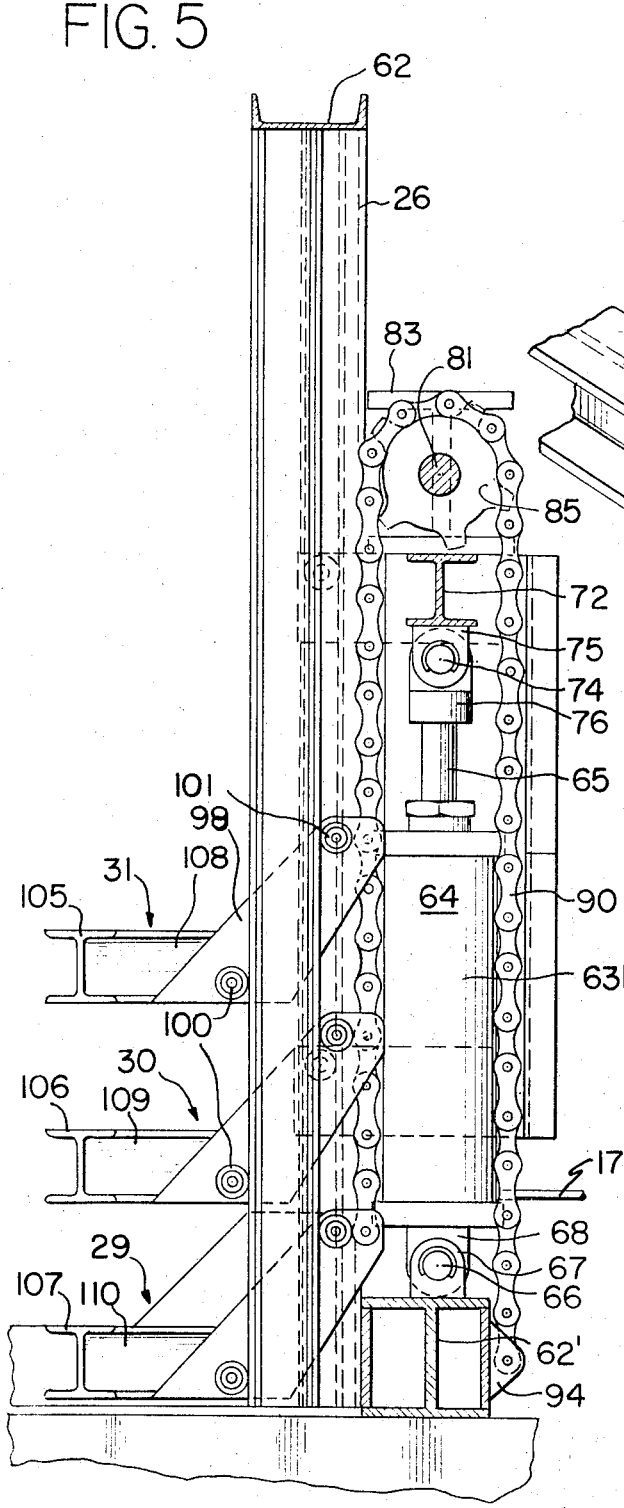
FIGURE 5 is a sectional view taken along line 5—5 of FIGURE 3 with the rail support devices shown in their lowered positions.

Referring to FIGURES 1 and 2 of the illustrative drawings, there is shown a flatcar 20 having wheels 21 which can ride on spaced rails 22. Mounted on the flatcar 20 is an apparatus generally indicated at 23 for storing and transferring rails 24.

The apparatus 23 is shown to include pairs of vertical transferring mechanisms generally indicated at 25 and 26, and 27 and 28. Each of the vertical transferring mechanisms 25 through 28 is shown to have three vertically spaced support devices 29, 30 and 31, each of which overhangs a side of the flatcar 20 considerably to provide considerable additional storage capacity. Frames 35, 36, 37 and 38 mounted on the flatcar 20 are provided to support pairs of transverse conveyors 39 and 40, and 41 and 42. The transverse conveyors 39 through 42 are operable to convey rails transversely to a longitudinal central zone 43 at which there is disposed a longitudinal conveyor generally indicated at 44. The longitudinal conveyor 44 is shown to be mounted on the flatcar 20 by a frame 45 having spaced frame members 46, 47 and 48.

A pair of transferring mechanisms 50 and 51 serves to transfer rails one-by-one onto the longitudinal conveyor 44 from the transverse conveyors 39 and 40, while a pair of transferring mechanisms 52 and 53 serves to transfer rails one-by-one onto the longitudinal conveyor 44 from the pair of transverse conveyors 41 and 42.

The rails 24 are shown in FIGURES 1 and 2 to be arranged in two sets S and S' of tiers of rails designated generally as 54, 55, and 56, with rail sets S and S' straddling the central zone 43.

Figure 6:
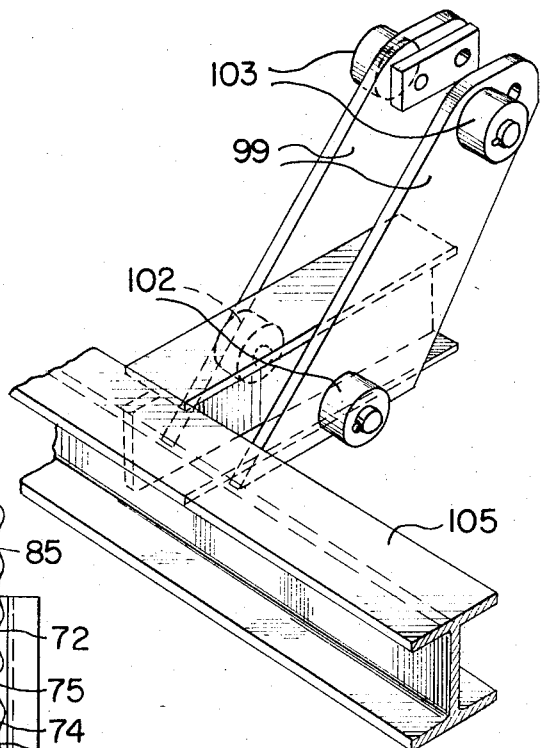
FIGURE 6 is a perspective view showing a fragmentary portion of a support member of one rail support device.

In FIGURES 3 through 8, only the vertical transferring mechanism 26 is shown in detail since transferring mechanisms 25, 27 and 28 are of identical construction. The vertical transferring mechanism 26 is shown to include a suitable frame 60 mounted on the flatcar 20. The frame 60 includes a pair of spaced uprights 61 joined at their upper and lower ends by horizontal supports 62 and 62'. A piston-cylinder mechanism 63b is shown to include a cylinder 64 and a piston rod 65 which is connected at one end to a piston (not shown) mounted for movement within the cylinder 64. The cylinder 64 is mounted on the horizontal support 62' by a pivot pin 66 which passes through bearings 67 and an apertured extension 68 of the cylinder 64. The other end of the piston rod 65 is connected to a vertically movable sub-frame generally indicated at 70. The sub-frame 70 is shown to include an X-shaped brace 71 and a horizontal support 72 joined for example by welding to the upper end of the X-shaped brace 71. Rollers 73 guide the sub-frame 70 for vertical movement. The piston rod 65 is connected to the sub-frame 70 by a pin 74 which passes through bearings 75 mounted on the horizontal support 72 and an apertured extension 76 secured to the end of the piston rod 65. The sub-frame 70 also includes a sprocket mounting generally indicated at 80 which includes aligned shafts 81 secured to mounting bracket pairs 82 and 83, and 83, and 84, respectively, on the horizontal support 72. Sprockets 85 and 86 are mounted for rotation on the shafts 81.

Spaced roller chains 90 and 91 extend upwardly from and are secured to the horizontal support 62' by means of pins 92 and 93 which pass through apertured brackets 94 and 95, respectively. The roller chains 90 and 91 are trained over the sprockets 85 and 86. Marginal ends 96 and 97 of the roller chains 90 and 91 secure, at vertically spaced intervals, pairs of mounting brackets 98 and 99. Each of the vertically spaced pairs of brackets 98 and 99 carries two spaced pairs of rollers 100 and 101, and 102 and 103, respectively. Rollers 100 and 102 bear against the one side of the uprights 61, while rollers 101 and 103 bear against the other side of the uprights 61.

Horizontal rail support platforms 105, 106, and 107 are joined to each pair of brackets 98 and 99 by extension members 108, 109, and 110, respectively, as shown in FIGURE 7 for example. The horizontal rail support platforms 105, 106, and 107 support the ends of the rails in one set of tiers 54, 55, and 56.

In FIGURES 9 through 11 of the drawings, there is shown the transverse conveyor 42 and a fragmentary portion of the transverse conveyor 40 and transfer mechanisms 51 and 53. Since the conveyors 39, 40, 41, and 42 are identical in construction, conveyor 42 alone is described in detail. The conveyor 42 is shown to have a roller chain 115 trained around horizontally opposed sprockets 116 and 117. The sprockets 116 and 117 are secured to respective shafts 116′ and 117′. The shaft 116′ is mounted for horizontal sliding movement in opposed channels 118 and 119 so that the chain tension can be adjusted by adjusting screws 120. The adjusting screws 120 are threadably received by threaded lugs 121 mounted on the channels 118 and 119. The shaft 117′ is journalled in the channels 118 and 119. The roller chain 115 slides over a wear plate 122 which is suitably secured to a channel 123.

The sprocket 117 is driven by a drive mechanism generally indicated at 124. The drive mechanism 124 includes an electric motor 125d which drives a sprocket 126 through a speed reducer 127. The drive mechanism 124 also includes a roller chain 128 trained over the sprocket 126 and a sprocket 117 secured to the shaft 117′.

A transferring mechanism 53 is located at the discharge end of the conveyor 42. The transferring mechanism 53 is shown to include a tiltable platform or support 135. The platform 135 has a rail-supporting face which terminates at a rail stop 136. The platform 135 is wide enough to accommodate a single rail 24. The platform 135 is tiltable about a pivot pin 137 secured to the frame 38. An actuating mechanism generally indicated at 138 is provided to tilt the platform 135 each time it is desired to transfer a rail 24 onto the longitudinal conveyor 44. The actuating mechanism 138 includes a piston-cylinder mechanism 139d having a piston rod 140. The piston-cylinder mechanism 139d is pivotally mounted on the frame 38 by a bracket-mounted pivot pin 141, while the piston rod 140 is pivotally secured to the platform 135 by a pivot pin 143. A tension spring 144 serves to return the platform 135 to the position shown in FIGURE 9 after a rail has slid down a chute 145. When the platform 135 of the transferring mechanism 51 is pivoted in a clockwise direction as viewed in FIGURE 9, the stop 136 is pivoted to below the chute 145 and rear face 135″ of the platform 135 provides a rail stop for the next successive rail. The discharge end 146 of the chute 145 is arched to provide a relatively smooth transition between the chute 145 and the longitudinal conveyor 44.

The longitudinal conveyor 44 is shown in detail in FIGURES 12 through 14 of the drawings. The longitudinal conveyor 44 is shown to have a drive shaft 150 suitably journalled in longitudinally extending members 152, 153, and 154. The members 153 and 154 serve additionally to guide successive rails 24 for longitudinal movement in aligned end-to-end relationship. A motor 155 drives a roller chain 156 which is trained over a sprocket 157 mounted on the shaft 150. Spaced between the members 152 and 153 and mounted on the shaft 150 is a sprocket 158. Spaced in a longitudinal direction from the shaft 150 is a shaft 159 to which sprockets 160, 161 and 162 are secured. A roller chain 163 is trained over the sprockets 158 and 161 to drive the shaft 159. A sprocket 164 is mounted on a shaft 165 which is spaced longitudinally in one direction from the shaft 159 and a sprocket 166 mounted on a shaft 167 is spaced longitudinally in the other direction from the shaft 159. A roller chain 163′ is trained over sprockets 160 and 164, and a roller chain 163″ is trained over sprockets 162 and 166. Shafts 159, 165, and 167 carry rollers 168, 169, and 170, respectively, for supporting and conveying the rails 24 for longitudinal movement.

Referring now to FIGURE 15, there is shown a control mechanism generally indicated at 171 for controlling the raising and lowering of vertical rail transferring mechanisms 25 through 28. The rail transferring mechanisms 25 through 28 have piston-cylinder mechanisms 63a, 63b, 63c, and 63d, respectively. The control mechanism 171 is shown to include a reservoir 172 containing a suitable fluid such as oil indicated at 173. A motor driven pump 174 draws the oil 173 from the reservoir 172 by conduit 175 and discharges the oil through a conduit 176 to a valve 177. Connected to the valve 177 are conduits 178 and 179. Branch conduits 178a and 178b connect the conduit 178 to the piston-cylinder mechanisms 63a and 63b, while branch conduits 179a and 179b connect the conduit 179 to the piston-cylinder mechanisms 63c and 63d. Balancing cocks 180 are disposed in the branch conduits 178a, 178b, 179a and 179b. Valves 181 and 182 are disposed in the conduits 178 and 179, respectively, downstream of the valve 177 and upstream of the balancing cocks 180. Conduits 183 and 184 connected to the respective valves 181 and 182 serve to return oil from the conduits 178 and 179 to the reservoir 172. Bleed valves 185 and 186 are disposed in conduits 183 and 184, respectively.

When the valves 177 and 181 are in the positions shown, the pump 174 is able to draw oil 173 from the reservoir 172 through the conduit 175 and force the oil under pressure through the valve 177, through the conduit 178 and through the valve 181 to actuate both of the piston-cylinder mechanisms 163a and 163b to thus raise the rail support devices 29, 30, and 31 of the rail transferring mechanisms 25 and 26. When the support devices 29, 30, and 31 of the transferring mechanisms 25 and 26 have been raised to their fully raised positions, the valve 181 is positioned to provide communication between the portion of the conduit 178 which is connected to the branch conduits 178a and 178b and the conduit 183. The valve 185 is in the closed position, and when for example it is desired to lower the lowermost tier 56 of rails of rail set S onto the transverse conveyors 39 and 40, the valve 185 is opened to bleed oil back into the reservoir 172. When the lowermost tier 56 has been deposited on the transverse conveyors 39 and 40, the valve 185 is closed so that the descent of the support devices 29, 30 and 31 of the vertical transferring mechanisms 25 and 26 ceases. When the lowermost tier 56 has been loaded onto the transverse conveyors 39 and 40 and the transverse conveyors 39 and 40 have conveyed all the rails to the longitudinal conveyor 44, the valve 185 is again opened to bleed additional oil into the reservoir 172 until the tier 55 is loaded onto the transverse conveyors 39 and 40. At that time, the valve 185 is again closed. The same procedure is followed for loading the tier 54 onto the transverse conveyors 39 and 40.

Repositioning of the valve 177 to provide communication between the conduits 176 and 179 enables the vertical transferring mechanisms 27 and 28 to be raised or lowered in the same manner as indicated above.

Also shown in FIGURE 15 of the drawings is a control mechanism generally indicated at 202 for controlling the operation of the transferring mechanisms 50 through 53. Piston-cylinder mechanisms 138a, 138b and 138c and 138d control pairs of transferring mechanisms 50 and 51, and 52 and 53, respectively. The control mechanism 202 includes a conduit 203 connected to a valve 204 and the pump 174. Conduits 206 and 207 lead from the valve 204 to pairs of piston-cylinder mechanisms 138a and 138b, and 138c and 138d, respectively. A vent conduit 208 leads from the valve 204 to the reservoir 172. When it is desired to transfer a rail, for example, from the transverse conveyors 39 and 40 onto the longitudinal conveyor 44, the valve 204 is positioned as indicated in FIGURE 15 and the pump 174 causes the transferring mechanism 51 for example assume the position shown in FIGURE 9, so that one rail is tilted and permitted to slide down its associated chute 145. When the rail has cleared the chute 145, the valve 204 is actuated by the operator or by a suitable control to establish communication between the conduits 206 and 208, thus bleeding oil from the piston-cylinder mechanisms 138a and 138b to the reservoir 172 when the transferring mechanisms 50 and 51 are returned to their initial positions by their respective springs 144.

When it is desired to transfer a rail from the transverse conveyors 41 and 42, the valve 204 is positioned to establish communication between the conduits 203 and 207. Until the time arrives for either pair of mechanisms 138a and 138b, and 138c and 138d to be actuated, the passage through the valve 204 is positioned out of registry with any of the conduits 203, 206, and 207 and 208.

Referring now to FIGURE 16 of the drawings, there are shown motors 125a, 125b, 125c, 125d, and 155. Leads 188 and 189 lead from a suitable source of electrical energy supply. The lead 188 is connected to a lead 190 and the lead 189 is connected to terminals 191 and 192 of a switch generally indicated at 193. The switch 193 has contacts 194 alternately engageable with pairs of contacts 195 and 196. Lead 190 is connected to one side of each of the motors 125a through 125d and 155. The other sides of motors 125a and 125b are connected to a lead 197, while the other sides of motors 125c and 125d are connected to a lead 198. The other side of the motor 155 is connected to a lead 199 containing a switch 200. When the switch 193 is positioned to establish electrical contact between pairs of contacts 194 and 195, motors 125a and 125b are energized and motor 155 is also energized provided the switch 200 is closed. When the switch 193 is postioned to establish electrical contact between pairs of contacts 194 and 196, the motors 125c and 125d are energized and the motor 155 is energized provided the switch 200 is closed. It is apparent that the motors 125a and 125b for the transverse conveyors 39 and 40 and the motor 155 for the longitudinal conveyor 44 can be energized, while the motors 125c and 125d for the transverse conveyors 41 and 42 are de-energized. Alternately, the motors 125c, 125d and 155 can be energized, while the motors 125a and 125b are de-energized. By this arrangement, the motor 155 for the longitudinal conveyor 44 is always in operation when the motors for either pair of transverse conveyors 39 and 40, and 41 and 42 are in operation.

The operation of the rail storing and transferring apparatus 23 is now to be further described. Assume that the rail support devices 29, 30 and 31 of each of the vertical rail transferring mechanisms 25 through 28 are in their fully lowered positions as exemplified in FIGURE 5 of the drawings and that the apparatus 23 is completely empty of rails. With the pump 174 in operation, the valves 177 and 181 are positioned shown in FIGURE 7 of the drawings and the valve 185 is closed. The pump 174 draws oil 173 from the reservoir 172 and pumps the oil into the piston-cylinder mechanisms 63a and 63b until associated rail support devices 29, 30 and 31 are fully raised. Then the valve 181 can be positioned to establish communication between that portion of the conduit 178 to which branch conduits 178a and 178b are directly connected and the conduit 183. Then the valve 177 is positioned to establish communication between the conduit 176 and the conduit 179 with the valve 182 positioned as shown in FIGURE 15 of the drawings and the same procedure is followed for actuating the piston-cylinder mechanisms 63c and 63d.

With the transferring mechanisms 25 through 28 in their raised positions as shown for example in FIGURE 4, rails are lowered one-by-one and horizontally positioned by means of a crane (not shown) so that the rails 24 are positioned side-by-side in tiers 54, 55 and 56 as shown for example in FIGURES 1 and 2. When the apparatus 23 is loaded with the rails 24, the flatcar 20 which carries the apparatus 23 can be rolled over the rails 22 to the site at which rails are to be welded into continuous lengths. A welding apparatus, for example the one shown in United States Patent No. 2,911,516, is now capable of receiving rails 24 conveyed along the central zone 43 of the apparatus 23. Let it be assumed that the lowermost tiers 56 of both rail sets S and S' is to be lowered onto the pairs of transverse conveyors 39 and 40, and 41 and 42, respectively. The valves 185 and 186 are opened sufficiently to bleed oil through conduits 183 and 184, respectively, into the reservoir 172 until the lowermost tiers 56 of each rail set S and S' are entirely supported by the pairs of transverse conveyors 39 and 40, and 41 and 42. When the rails are thus supported each of the valves 185 and 186 is closed. At this point, the rail supporting devices 29 of the vertical transferring mechanisms 25 through 28 are slightly below the rail supporting level of the conveyors 39 through 42. It is apparent that each pair of transferring mechanisms 25 and 26, and 27 and 28 is lowered in synchronism by opening valves 185 and 186, respectively. Balancing cocks 180 assure that the oil bleeds uniformly out of each pair of transferring mechanisms 25 and 26, and 27 and 28. Assuming that rails are ready to be fed to the welding apparatus, the switch 193 is closed to establish electrical contact between the pairs of contacts 194 and 195, for example. Assuming the switch 200 is closed, as is normally the case, motors 125a, 125b and 155 are started in operation, thus starting transverse conveyors 39 and 40 and the longitudinal conveyor 44. The leading rail 24 is conveyed by the roller chains 115 until it abuts the stop 136 of each of the transferring mechanisms 50 and 51. Since the movement of the roller chain 115 continues, the rails 24 continue to move toward the leading rail until the rails are in abutment as shown in FIGURE 9 of the drawings, and the chain 115 slides over the wear plate 122. When it is desired to transfer one of the rails onto the conveyor 44, the valve 204 is positioned as shown in FIGURE 15 so as to operate piston-cylinder mechanisms 138a and 138b simultaneously. Their piston rods 140 will thus be extended outwardly to overcome the urging forces of their springs 144 to cause the platforms 135 to tilt so that the stops 136 are caused to pass beneath the upper surface of the chutes 145. The tiltable platforms 135 are both tilted at a sufficient angle of inclination to enable the rail 24 to slide off the tiltable platforms 135 and down the chute 145 onto the longitudinal conveyor 44. After the rail 24 has cleared the path of the tiltable platforms 135, the valve 204 is positioned to provide communication between the conduits 206 and 208, thus bleeding the oil from the piston-cylinder mechanisms 138a and 138b into the reservoir as their springs 144 return the tiltable platforms 135 to their initial positions. The conveyors 39 and 40 advance the next rail onto the platforms 135 and bring the next rail 24 into abutment with the stop 136. The piston-cylinder mechanisms 138a and 138b are then ready to be reactuated to transfer another rail onto the longitudinal conveyor 44.

When the conveyors 41 and 42 are to be unloaded, the switch 193 is positioned so that electrical contact is established between pairs of contacts 194 and 196 to cause energization of motors 125c, 125d and 155. When the transferring mechanisms 52 and 53 are ready to be operated, the valve 204 is positioned so as to provide communication between the conduits 203 and 207 to cause simultaneous actuation of the piston-cylinder mechanisms 138c and 138d. The pair of conveyors 41 and 42 are emptied in the same manner as the pair of conveyors 39 and 40.

Assuming that there are no more rails positioned on the pair of transverse conveyors 39 and 40, the operator can open the valve 185 until sufficient oil has been bled from the piston-cylinder mechanisms 63a and 63b to lower tier 55 of rail set S of rails onto the pairs of transverse conveyors 39 and 40. The valve 185 is then closed to interrupt the downward movement of the rail support devices 29, 30 and 31 of the vertical transferring mechanisms 25 and 26. Further actuation of the pairs of transferring mechanisms 25 and 26, and 27 and 28 is controlled by opening the valves 185 and 186, respectively.

Other embodiments and modifications of this invention will suggest themselves to those skilled in the art, and all such of these as come within the spirit of this invention are included within its scope as best defined by the appended claims.

I claim:

1. In combination with a railroad car, an apparatus for storing and transferring rails: means mounting said apparatus on the car, means for vertically transferring at least two vertically spaced tiers of longitudinally extending rails, including a pair of longitudinally spaced vertical transferring mechanisms for supporting opposite rail ends, each of said vertical transferring mechanisms including vertically spaced, horizontal platforms, said platforms being arranged in pairs to space said tiers, positively driven means to receive successively the tiers of rails from said vertical transferring means for continuously moving the rails transversely into an abutting arrangement toward a transferring end of said transverse conveying means, means for conveying rails longitudinally in alignment with each other, and means for transferring rails one-by-one onto said longitudinal conveying means from said transverse conveying means, each of said vertical transferring mechanisms including a piston-cylinder mechanism, a reservoir, a motor-drive pump for pumping liquid from said reservoir into said piston-cylinder mechanisms, valve means for enabling liquid to be bled into said reservoir from said piston-cylinder mechanisms of said vertical transferring mechanisms to enable the first tier of rails to be lowered onto said transverse conveying means and to enable the second tier of rails to be lowered onto said transverse conveying means when said transverse conveying means has been emptied of rails.

2. Apparatus as claimed in claim 1, wherein said means for transferring rails one-by-one onto said longtiudinal conveying means includes a tiltable support and a second piston-cylinder mechanism for actuating said tiltable support, conduit means connecting said second piston-cylinder mechanism to said pump and said reservoir, and valve means in said conduit means for controlling the passage of liquid into and out of said second piston-cylinder mechanism of said transferring means.

3. Apparatus as claimed in claim 2, wherein said tiltable support includes an integral rail stop.

References Cited

UNITED STATES PATENTS

| | | | |
|---|---|---|---|
| 996,386 | 6/1911 | Williams | 198—105 |
| 1,452,711 | 4/1923 | Schroeder et al. | 198—1 |
| 2,410,492 | 11/1946 | Garrow | 198—105 |
| 2,630,909 | 3/1953 | Mariotte. | |
| 2,780,376 | 2/1957 | Sanders | 214—83.36 |
| 2,856,895 | 10/1958 | Anderson et al. | 214—1 |
| 2,900,091 | 8/1959 | Minter | 214—1 |
| 2,918,186 | 12/1959 | Cirillo | 214—231 |
| 2,921,508 | 1/1960 | Schneider et al. | 214—6 |
| 2,975,923 | 3/1961 | Ulinski | 214—730 |
| 2,990,069 | 6/1961 | Reapasky et al. | |
| 3,036,413 | 5/1962 | Schulte | 214—1 |
| 3,083,842 | 4/1963 | Bauer et al. | 214—2.5 |
| 3,087,634 | 4/1963 | Cornell et al. | 214—16.4 |
| 3,141,560 | 7/1964 | Rink | 214—16.4 |
| 3,182,816 | 5/1965 | Illo | 214—1 |
| 3,229,831 | 1/1966 | Long | 214—5.5 |

FOREIGN PATENTS

| | | |
|---|---|---|
| 1,014,905 | 8/1957 | Germany. |

GERALD M. FORLENZA, *Primary Examiner.*

R. B. JOHNSON, *Assistant Examiner.*